July 16, 1963 L. J. VIERNSTEIN 3,098,196
USE OF ULTRASONIC BIAS IN MAGNETIC AMPLIFIERS
Filed Jan. 18, 1961 2 Sheets-Sheet 1

LAWRENCE J. VIERNSTEIN
INVENTOR

BY W. O. Quesenberry
Claude Funkhouser
ATTORNEYS

July 16, 1963 L. J. VIERNSTEIN 3,098,196

USE OF ULTRASONIC BIAS IN MAGNETIC AMPLIFIERS

Filed Jan. 18, 1961 2 Sheets-Sheet 2

LAWRENCE J. VIERNSTEIN
INVENTOR

BY W. O. Quesenberry
Claude Funkhouser
ATTORNEYS

United States Patent Office 3,098,196

Patented July 16, 1963

3,098,196
USE OF ULTRASONIC BIAS IN MAGNETIC AMPLIFIERS

Lawrence J. Vierstein, Kensington, Md., assignor to the United States of America as represented by the Secretary of the Navy Filed Jan. 18, 1961, Ser. No. 83,601
12 Claims. (Cl. 323—89)

This invention relates generally to magnetic circuits and more specifically to magnetic amplifiers and magnetic memory cores.

In general, the overall response of low gain magnetic amplifiers has prevented their use in applications which require high accuracy and speed of performance. The high performance servo systems necessary for control of missiles and aircraft are included within this problem area. The difficulties relate primarily to the characteristics of non-linearity and low gain found at low input signal levels in most magnetic circuits. Magnetic amplifiers have been very successfully used in power control applications where reliability and accuracy are less critical. However, any further extension of the field of use of magnetic amplifiers requires a solution to the accuracy and speed of performance difficulties now associated with these circuits.

The invention, as a solution to this problem, contemplates the application of a low level external bias of ultrasonic frequency to each ferro-magnetic core of the magnetic circuit. This external field serves to maintain the magnetic domains in constant agitation, thereby effectively eliminating magnetic buildup time and maintaining the system in a more linear portion of the operating region. The result is improved linearity and a very high speed of response.

Accordingly it is the principal object of the present invention to provide an arrangement for the improvement of linearity and speed of response in magnetic amplifiers.

Another object of the invention is to provide a magnetic amplifier having increased gain at low signal levels.

A further object of the invention is to provide an arrangement whereby a high frequency magnetic field may be simultaneously applied to several magnetic memory cores so as to significantly reduce the voltage drive requirements thereof.

Other objects and many of the attendant benefits of this invention will be readily appreciated as the same becomes better understood by reference to the following detailed description when considered in connection with the accompanying drawings, in which.

Figure 1:
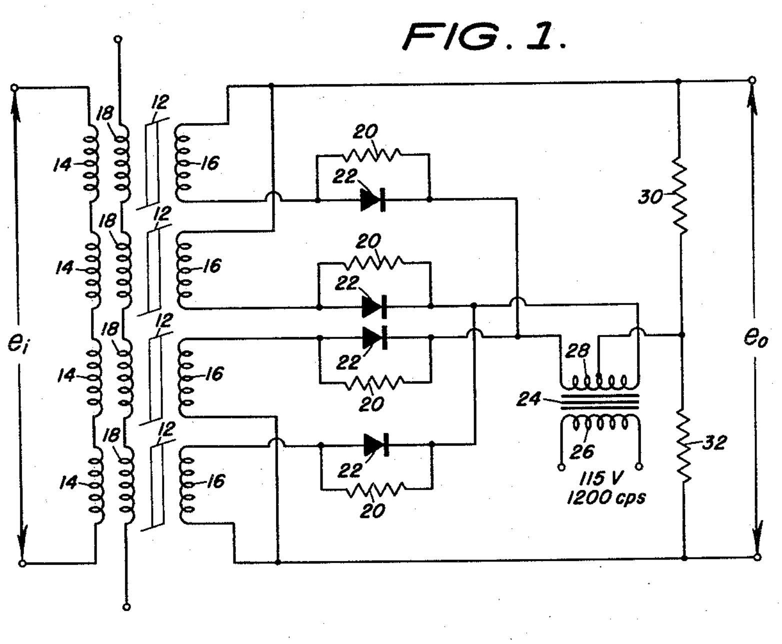
FIG. 1 is a circuit schematic of a magnetic amplifier embodying the invention.

The magnetic amplifier of FIG. 1 consists of a ferromagnetic core 12, signal windings 14, and output load windings 16. Driving power is supplied to the amplifier through power transformer 24 having a primary winding 26 to which 115 volts at 1200 c.p.s. is applied and a center tapped secondary 28 which is connected through diode rectifiers 22 to the output load windings 16 of the amplifier. Resistances 20 are provided in shunt with diode rectifiers 22 to provide self biasing of the diodes. The center tap on the secondary 28 of power transformer 24 is connected between a pair of output resistances 30 and 32.

The basic principle of operation of the magnetic amplifier is as follow: the permeability and hence the inductive reactance of a ferromagnetic core is reduced when it is saturated. Thus the flow of alternating current in the load resistance will increase as the direct control current is increased. It is therefore possible to control large alternating currents with much smaller signal or control currents. In the circuit of FIG. 1 diode rectifiers 22 are added in series with the output coils 16 so that some or all of the output current may be fed back in a positive manner to increase the magnetic saturation caused by the control current, and this serves in turn to increase the gain.

The diode shunts 20 provide self biasing for the diode rectifiers 22 and also provide for negative feedbacks by way of reverse current around the rectifier. This provides for added stability in the circuit.

Figure 2:
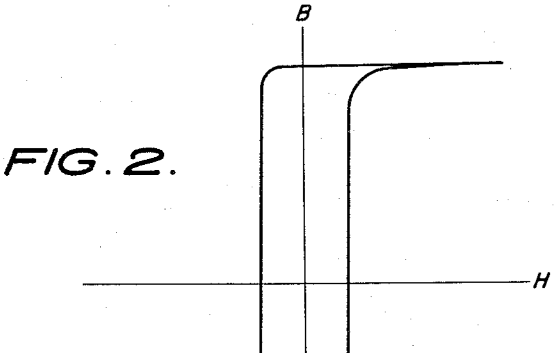
FIG. 2 is a graphical representation of the flux-current response for a common inductance.

When the core material of an inductor has constant permeability, the magnetizing current lags the sinusoidal applied voltage by 90°. In this somewhat idealized case no power is absorbed from the line nor dissipated in the core. However, when the B–H plot opens up into a finite area, a component of current in phase with the line voltage appears, and in the case of complete saturation, the magnetizing current is completely in phase with the line. Under these condition, real power is absorbed from the line, to be dissipated in driving the core cyclically through the range of B and H indicated by the flux-current loop of FIG. 2. The electrical energy lost in the core per cycle equals $$E=\frac{1}{4\pi}\int BdH$$

This value is the area in the flux-current loop.

Figure 3:
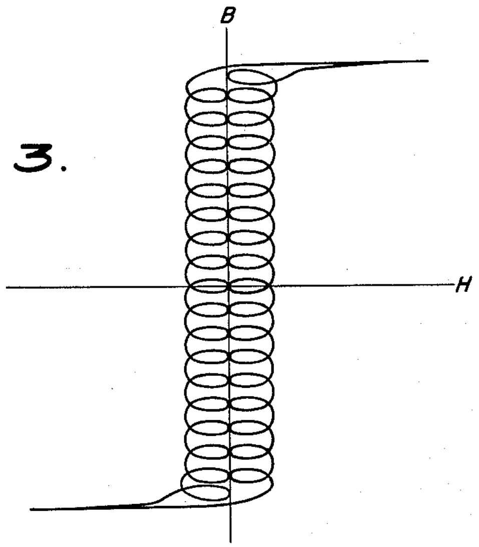
FIG. 3 is a graphical representation of the effect of the invention on the flux-current response of a magnetic core.

The invention contemplates a reduction in the area of the flux-current loop, and thus a reduction of energy loss, through the application of a high frequency magnetic field to the core. The effect of this high frequency field on the performance of the core is illustrated in FIG. 3. The field introduces whorles in the B–H curve which in effect fill in the dead space in the curve. This reduction in area of the loop indicates a corresponding reduction in core loss. The practical effect of the field is that it keeps the magnetic domains in constant agitation thereby eliminating the initial time and energy loss commonly associated with magnetic build-up.

The high frequency magnetic field may be applied to magnetic amplifiers in series with the control voltage, by way of a separate winding on the core, or through the application of an external field to the core. The amplifier shown in FIG. 1 utilizes a separate bias winding 18 on the ferromagnetic core for the application of the high frequency field thereto. The bias coil 18 may be wound on the core as a conventional toroidal coil so that the flux produced by the field travels circumferentially through the core or the coil may be wound circumferentially about the core so that the field produced thereby will be perpendicular to the surface of the core. Either configuration will be effective in producing the proper magnetic agitation in the core.

Figure 4:
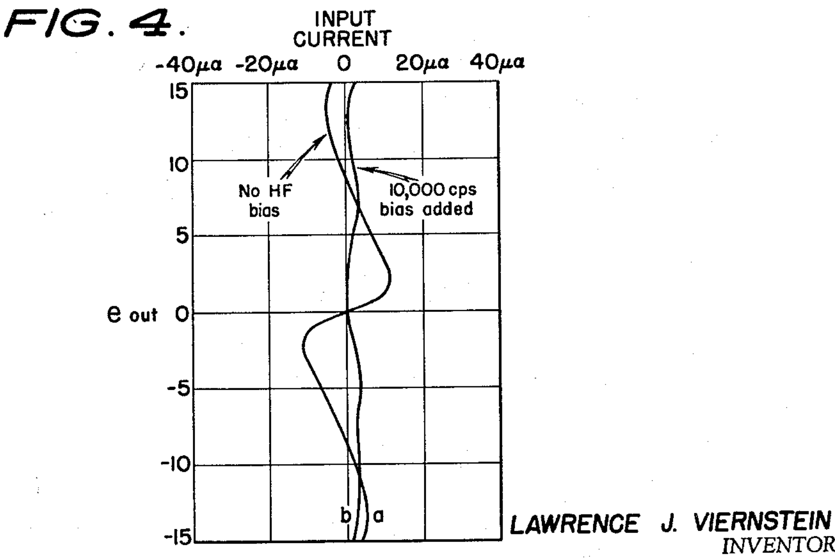
FIG. 4 is a graphical representation of the improved response of a magnetic operational amplifier embodying the invention.

The result of ultrasonic bias on the performance of magnetic operational amplifiers is illustrated by the curves of FIG. 4. Maximum linearity and optimum performance are achieved in operational amplifiers when the amplifiers are operating at infinite gain, i.e., when the input current to the amplifier is zero for all values of output voltage. This is certainly the idealized situation and is not attainable even with the use of vacuum tube amplifiers. Curve (*a*) of FIG. 4 represents the response of a magnetic amplifier set up as an operational amplifier without the application of an ultrasonic bias thereto. Curve (*b*) represents the response of this same amplifier when an ultrasonic bias field is added according to the invention. It is seen that with the bias field added the response follows much more closely to the idealized condition of zero input current. FIGURE 4 graphically illustrates the improvement in linearity and increase in gain made possible by the instant invention.

The use of a high frequency bias voltage to improve linearity and speed of response is not limited to magnetic amplifiers, but is equally adaptable to magnetic memory cores in computers. This external source of energy which can be introduced acoustically, or by magnetic or electromagnetic means to the memory array materially reduces the power required by "read in" and "read out" circuits. This dithering of the cores may be accomplished en masse, that is, an external magnetic field could be applied to a large number of cores simultaneously by arranging the cores in a stacked relation within the high frequency magnetic bias field. This would greatly reduce the drive requirements of a multitude of individual input-output circuits.

In any application of the invention the frequency of the bias field should be at least of higher value than the frequency of the driving voltage. It is preferred that the frequency be in the ultrasonic range although this is not a strict requirement of the invention. Frequencies in the upper sonic region (between 10 and 20 mc.) will work to a lesser degree of satisfaction but will improve the response of the magnetic device over the lower frequency bias situation. The magnitude of the bias voltage governs the size of the minor loops introduced in the B–H curve and may be varied to set the amplitude of the whorles to a small value or to increase their amplitude until they overlap .

Obviously, many modifications and variations of the present invention are possible in the light of the above teachings. It is therefore to be understood that within the scope of the appended claims the invention may be practiced otherwise than as specifically described.

What is claimed is:

1. A magnetic amplifier comprising a ferromagnetic core, a control winding on said core, an output circuit including an output winding, a power source, said output winding connected to said power source, and means for applying an ultrasonic frequency magnetic bias field to said core.

2. A magnetic amplifier as recited in claim 1 wherein said means comprises a bias winding on said core having a high frequency voltage source connected thereto.

3. A magnetic amplifier as recited in claim 2 wherein said bias winding comprises a toroidal coil wound on said core so that the resulting flux generated by the bias field travels circumferentially through the core.

4. A magnetic amplifier as recited in claim 2 wherein said bias winding comprises a circumferential coil wound about the perimeter of the core so that the magnetic field produced thereby creates a flux which is perpendicular to the surface of the core.

5. A magnetic amplifier having a control circuit, a pair of load circuits connected in push-pull across an alternating current power source, said load circuit including two pairs of saturable reactors each having load windings, and rectifier means connected in series with each load winding to permit conduction in one pair of windings during one-half cycle of the supply voltage and conduction in the other pair of windings during the other half cycle of the supply voltage, and a bias winding on each core for applying to the cores an ultrasonic magnetic field.

6. A magnetic amplifier comprising two pairs of saturable magnetic cores having load and control windings, an output circuit including an alternating current power source, rectifiers connected to each load winding, and a load impedance associated with each pair of cores, each pair of load windings being connected in series with the supply source, a load impedance and a pair of rectifiers poled such that one pair of load windings will conduct on one-half cycle and the other pair on the other half cycle of the source voltage, and a magnetic bias of ultrasonic frequency applied to said cores to maintain the cores in a state of magnetic agitation.

7. A full wave magnetic amplifier employing both positive and negative feedback, comprising two pairs of saturable magnetic cores having load windings, control windings, and a control voltage source, said load windings being connected in push-pull across an alternating current power source, and means for applying an ultrasonic magnetic field to the magnetic cores thereby maintaining the cores in a state of magnetic agitation.

8. A full wave magnetic amplifier as defined in claim 7 wherein said means comprises a bias winding on said core having a high frequency voltage source connected thereto.

9. A full wave magnetic amplifier as defined in claim 7 wherein said means comprises a high frequency voltage source connected to the control winding in series with the control voltage source.

10. A magnetic amplifier comprising two pairs of saturable magnetic cores having load and control windings, an output circuit including an alternating current power source, a power transformer having a primary winding and a center tapped secondary winding, rectifiers connected to each load winding, a pair of load impedances connected in series relation to each other and in parallel with each pair of load windings, the center connection of each pair of load windings being connected to opposite ends of the secondary winding of the power transformer and the center point of said load impedances being connected to the center tap of said secondary winding such that one pair of load windings will conduct on one-half cycle of the supply voltage and the other pair of load windings will conduct on the other half cycle of the supply voltage, and a magnetic bias field of ultrasonic frequency applied to said cores to maintain the cores in a state of magnetic agitation.

11. A magnetic circuit including at least one ferromagnetic core having a control winding, a control voltage source and a load winding, and means for applying to said core a magnetic field of ultrasonic frequency, said means comprising a bias winding on said core having a high frequency voltage source connected thereto.

12. A magnetic circuit including at least one ferromagnetic core having a control winding, a control voltage source and a load winding, and means for applying to said core a magnetic field of ultrasonic frequency, said means comprising a high frequency voltage source connected to the control winding in series with the control voltage source.

References Cited in the file of this patent

Text: Magnetic Amplifier Circuits, by William A. Geyger, published in 1924, pages 100–103.

Audio Engineering, "Magnetic Audio Frequency Frequency Fundaments" by A. M. Vincent, September 1952, pages 42–27.